(12) United States Patent
Ghag et al.

(10) Patent No.: US 12,073,242 B2
(45) Date of Patent: *Aug. 27, 2024

(54) MICROSERVICE SCHEDULING

(71) Applicant: VMware LLC, Palo Alto, CA (US)

(72) Inventors: Aditi Ghag, Palo Alto, CA (US); Pranshu Jain, Palo Alto, CA (US); Yaniv Ben-Itzhak, Heryzliya (IL); Jianjun Shen, Palo Alto, CA (US)

(73) Assignee: VMware LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/086,067

(22) Filed: Dec. 21, 2022

(65) Prior Publication Data

US 2023/0127141 A1 Apr. 27, 2023

Related U.S. Application Data

(63) Continuation of application No. 16/223,235, filed on Dec. 18, 2018, now Pat. No. 11,579,908.

(51) Int. Cl.
*G06F 9/455* (2018.01)
*G06F 9/48* (2006.01)
*G06F 9/50* (2006.01)
*H04L 43/065* (2022.01)
*H04L 43/0876* (2022.01)

(52) U.S. Cl.
CPC ........ *G06F 9/45558* (2013.01); *G06F 9/4856* (2013.01); *G06F 9/4881* (2013.01); *G06F 9/505* (2013.01); *G06F 9/5077* (2013.01); *H04L 43/065* (2013.01); *H04L 43/0876* (2013.01); *G06F 2009/4557* (2013.01); *G06F 2009/45591* (2013.01); *G06F 2009/45595* (2013.01)

(58) Field of Classification Search
None
See application file for complete search history.

(56) References Cited

U.S. PATENT DOCUMENTS

| | | |
|---|---|---|
| 7,693,050 B2 | 4/2010 | Achlioptas et al. |
| 8,010,469 B2 | 8/2011 | Kapoor et al. |
| 8,250,213 B2 | 8/2012 | Glover et al. |
| 8,799,920 B2 | 8/2014 | Lubsey et al. |
| 9,244,669 B2 | 1/2016 | Govindaraju et al. |
| 9,294,407 B2 | 3/2016 | Antony |
| 9,301,026 B2 | 3/2016 | Srinivas et al. |
| 9,621,427 B1 | 4/2017 | Shah et al. |
| 10,031,783 B2 | 7/2018 | Jalagam et al. |
| 10,055,262 B1 | 8/2018 | Thomas |
| 10,075,377 B1 | 9/2018 | Sharma et al. |
| 10,075,514 B2 | 9/2018 | Wang et al. |
| 10,120,665 B1 | 11/2018 | Sunarno |
| 10,241,840 B2 | 3/2019 | Tsai et al. |

(Continued)

*Primary Examiner* — Eric C Wai
(74) *Attorney, Agent, or Firm* — Quarles & Brady LLP

(57) ABSTRACT

A method for containerized workload scheduling can include determining a network state for a first hypervisor in a virtual computing cluster (VCC). The method can further include determining a network state for a second hypervisor. Containerized workload scheduling can further include deploying a container to run a containerized workload on a virtual computing instance (VCI) deployed on the first hypervisor or the second hypervisor based, at least in part, on the determined network state for the first hypervisor and the second hypervisor.

18 Claims, 5 Drawing Sheets

(56) References Cited

U.S. PATENT DOCUMENTS

| | | |
|---|---|---|
| 10,250,443 B2 | 4/2019 | Chandrashekhar et al. |
| 10,282,222 B2 | 5/2019 | Thakkar et al. |
| 10,382,266 B1 | 8/2019 | Balakrishnan et al. |
| 10,452,572 B2 | 10/2019 | Lu et al. |
| 10,466,899 B2 | 11/2019 | Nagarajan et al. |
| 2002/0143953 A1 | 10/2002 | Aiken |
| 2011/0078303 A1 | 3/2011 | Li et al. |
| 2012/0066487 A1 | 3/2012 | Brown et al. |
| 2012/0204176 A1 | 8/2012 | Tian et al. |
| 2013/0042003 A1 | 2/2013 | Franco et al. |
| 2013/0054861 A1 | 2/2013 | Tsirkin et al. |
| 2013/0108259 A1 | 5/2013 | Srinivas et al. |
| 2014/0007091 A1 | 1/2014 | Arges et al. |
| 2014/0067999 A1 | 3/2014 | Lee et al. |
| 2014/0173595 A1 | 6/2014 | Anand et al. |
| 2014/0201218 A1 | 7/2014 | Catalano et al. |
| 2014/0245318 A1 | 8/2014 | Adams et al. |
| 2015/0039764 A1 | 2/2015 | Beloglazov et al. |
| 2015/0074262 A1 | 3/2015 | Antony |
| 2015/0089501 A1 | 3/2015 | Ganesan et al. |
| 2015/0149611 A1 | 5/2015 | Lissack |
| 2015/0341223 A1 | 11/2015 | Shen et al. |
| 2016/0022006 A1 | 1/2016 | Rabe et al. |
| 2016/0092259 A1 | 3/2016 | Mehta et al. |
| 2016/0103699 A1 | 4/2016 | Thakkar et al. |
| 2016/0124742 A1 | 5/2016 | Rangasamy et al. |
| 2016/0162320 A1 | 6/2016 | Singh et al. |
| 2016/0357451 A1* | 12/2016 | Chen ............... G06F 3/0611 |
| 2016/0364304 A1 | 12/2016 | Hanumantharaya et al. |
| 2017/0010907 A1 | 1/2017 | Challa et al. |
| 2017/0050111 A1 | 2/2017 | Perry et al. |
| 2017/0109184 A1 | 4/2017 | Ramani et al. |
| 2017/0187785 A1 | 6/2017 | Johnson et al. |
| 2017/0277554 A1 | 9/2017 | Oehrlein et al. |
| 2017/0302523 A1 | 10/2017 | Shah et al. |
| 2017/0302542 A1 | 10/2017 | Ruan et al. |
| 2017/0353516 A1 | 12/2017 | Gordon |
| 2017/0366405 A1 | 12/2017 | Ganesan et al. |
| 2017/0374032 A1 | 12/2017 | Woolward et al. |
| 2018/0027060 A1 | 1/2018 | Metsch et al. |
| 2018/0089053 A1 | 3/2018 | Chen et al. |
| 2018/0101486 A1 | 4/2018 | Lu et al. |
| 2018/0109606 A1 | 4/2018 | Alpert et al. |
| 2018/0121250 A1 | 5/2018 | Qi et al. |
| 2018/0123939 A1 | 5/2018 | Raman et al. |
| 2018/0136931 A1 | 5/2018 | Hendrich et al. |
| 2018/0139148 A1 | 5/2018 | Gamage et al. |
| 2018/0176102 A1 | 6/2018 | Bansal et al. |
| 2018/0198812 A1 | 7/2018 | Christodorescu et al. |
| 2018/0203736 A1 | 7/2018 | Vyas et al. |
| 2018/0241802 A1 | 8/2018 | Bernat et al. |
| 2018/0287903 A1 | 10/2018 | Joshi et al. |
| 2019/0026082 A1 | 1/2019 | Shalev et al. |
| 2019/0034228 A1 | 1/2019 | He et al. |
| 2019/0042298 A1 | 2/2019 | Sunku et al. |
| 2019/0165852 A1 | 5/2019 | Coleman et al. |
| 2019/0235901 A1 | 8/2019 | Aiyar et al. |
| 2019/0235922 A1 | 8/2019 | Iovanna et al. |
| 2019/0243561 A1 | 8/2019 | Battaiola Kreling et al. |
| 2019/0312933 A1 | 10/2019 | Richards et al. |
| 2019/0327112 A1 | 10/2019 | Nandoori et al. |
| 2019/0354403 A1 | 11/2019 | Ayyagari et al. |
| 2020/0026560 A1 | 1/2020 | Singh et al. |
| 2020/0026850 A1 | 1/2020 | Levin et al. |
| 2020/0028935 A1 | 1/2020 | Sahay et al. |
| 2020/0089516 A1 | 3/2020 | Vijayvargiya et al. |
| 2020/0192692 A1 | 6/2020 | Ghag et al. |
| 2020/0213239 A1 | 7/2020 | Cheng |
| 2020/0233692 A1 | 7/2020 | Kandula |
| 2020/0267071 A1 | 8/2020 | Ghag |
| 2020/0310847 A1 | 10/2020 | Schulze et al. |
| 2020/0334065 A1 | 10/2020 | Wang |
| 2020/0341789 A1 | 10/2020 | Ghag et al. |
| 2021/0042151 A1 | 2/2021 | Müller et al. |

* cited by examiner

MICROSERVICE SCHEDULING

RELATED APPLICATION

This application claims priority to and the benefit of co-pending U.S. patent application Ser. No. 16/223,235, filed on Dec. 18, 2018, entitled "CONTAINERIZED WORKLOAD SCHEDULING," by Aditi Ghag et al., and assigned to the assignee of the present application, which is incorporated herein by reference in its entirety.

BACKGROUND

Virtual computing instances (VCIs), such as virtual machines, virtual workloads, data compute nodes, clusters, and containers, among others, have been introduced to lower data center capital investment in facilities and operational expenses and reduce energy consumption. A VCI is a software implementation of a computer that executes application software analogously to a physical computer. VCIs have the advantage of not being bound to physical resources, which allows VCIs to be moved around and scaled to meet changing demands of an enterprise without affecting the use of the enterprise's applications. VCIs can be deployed on a hypervisor provisioned with a pool of computing resources (e.g., processing resources, memory resources, etc.). There are currently a number of different configuration profiles for hypervisors on which VCIs may be deployed.

DETAILED DESCRIPTION

Figure 1:
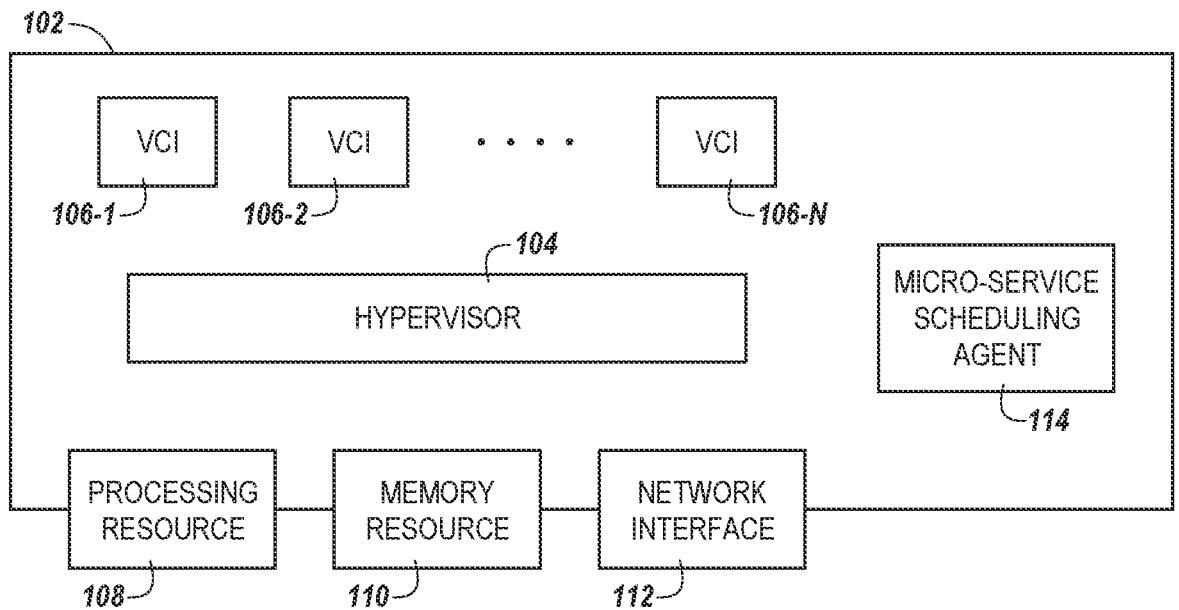
FIG. 1 is a diagram of a host for microservice scheduling according to the present disclosure.

The term "virtual computing instance" (VCI) covers a range of computing functionality. VCIs may include data compute nodes such as virtual machines (VMs). Containers, also referred to herein as a "containerized workload," can run on a host operating system without a hypervisor or separate operating system, such as a container that runs within Linux. A container can be provided by a virtual machine that includes a container virtualization layer (e.g., Docker). A VM refers generally to an isolated end user space instance, which can be executed within a virtualized environment. Other technologies aside from hardware virtualization can provide isolated end user space instances may also be referred to as VCIs. The term "VCI" covers these examples and combinations of different types of VCIs, among others.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. The host operating system can use name spaces to isolate the containers from each other and therefore can provide operating-system level segregation of the different groups of applications that operate within different containers. This segregation is akin to the VM segregation that may be offered in hypervisor-virtualized environments that virtualize system hardware, and thus can be viewed as a form of virtualization that isolates different groups of applications that operate in different containers. Such containers may be more "lightweight" than VMs at least because they share an operating system rather than operating with their own guest operating system.

Multiple VCIs can be configured to be in communication with each other in a software defined data center. In such a system, information can be propagated from an end user to at least one of the VCIs in the system, between VCIs in the system, and/or between at least one of the VCIs in the system and a non-virtualized physical host.

Software defined data centers are dynamic in nature. For example, VCIs and/or various application services, may be created, used, moved, or destroyed within the software defined data center. When VCIs are created (e.g., when a container is initialized), various processes and/or services start running and consuming resources. As used herein, "resources" are physical or virtual components that have a finite availability within a computer or software defined data center. For example, resources include processing resources, memory resources, electrical power, and/or input/output resources, etc.

Containerized cloud-native applications can be used to accelerate application delivery in software defined data centers. As used herein, "containerized" or "containerization" refers to a virtualization technique in which an application (or portions of an application, such as flows corresponding to the application) are encapsulated into a container (e.g., Docker, Linux containers, etc.) as an alternative to full machine virtualization. Because containerization can include loading the application on to a VCI, the application may be run on any suitable physical machine without worrying about application dependencies. Further, as used herein, "cloud-native applications" refer to applications (e.g., computer programs, software packages, etc.) that are assembled as microservices in containers deployed in a software defined data center. "Microservices" refer to a computing architecture in which an application is structured as a collection of loosely coupled (e.g., containerized) services. Microservice architectures may allow for improved application modularity, scalability, and continuous deployment in comparison to traditional application development environments.

In order to take advantage of the perceived benefits of containerized cloud-native applications, container schedulers such as KUBERNETES®, DOCKER SWARM®, MESOS®, etc. can be used to deploy and/or manage containerized applications. Container schedulers can consider parameters associated with the software defined data center on which they operate to deploy and/or manage the containerized applications. In some approaches, the parameters considered by the container scheduler can include host VCI resources (e.g., host VCI processing resources and/or memory resources), host VCI processing resource and/or memory resource utilization, and/or policy-based affinity rules (e.g., policy-based rules that can control the placement of VCIs and/or containers on host machines within a virtual cluster) as part of scheduling deployment and/or managing containers. This may be sub-optimal as the requirements of software defined data centers continue to expand.

For example, software defined data centers currently host a wide spectrum of applications with different needs, and therefore disparate application performance requirements. As the use of software defined data centers continues to increase, the spectrum of applications hosted on software defined data centers will continue to increase, further emphasizing the disparate performance requirements of the applications. For example, due to the dynamic nature of applications deployed in a software defined data center (e.g., applications running on VCIs, computers, etc. of the software defined data center), resource requirements of the applications may evolve over time, which can lead situations in which some approaches fail to adequately address evolving application performance requirements.

In order to address the dynamic nature of applications hosted on software defined data centers, embodiments disclosed herein can allow for a container scheduler to consider network states for the software defined data center such as VCI network states, hypervisor network statistics, application latencies (e.g., latency requirements of microservices deployed on containers), and network overlay parameters, among others described in more detail herein, when scheduling containers and/or microservices. For example, a method for microservice scheduling can include determining a network state for a first hypervisor in a virtual computing cluster (VCC). The method can further include determining a network state for a second hypervisor. Microservice scheduling can further include deploying a container to run a microservice on a virtual computing instance (VCI) deployed on the first hypervisor or the second hypervisor based, at least in part, on the determined network state for the first hypervisor and the second hypervisor.

Other embodiments can include determining a network state for a first VCI and a second VCI and deploying a container to run a microservice on the first VCI or the second VCI based, at least in part, on the determined network state for the first VCI and the second VCI. Yet other embodiments can include determining network state information for a cluster (e.g., a virtual computing cluster) and scheduling container and/or microservice deployment based on the network state information.

As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to."

The figures herein follow a numbering convention in which the first digit or digits correspond to the drawing figure number and the remaining digits identify an element or component in the drawing. Similar elements or components between different figures may be identified by the use of similar digits. For example, 106 may reference element "06" in FIG. 1, and a similar element may be referenced as 206 in FIG. 2. A group or plurality of similar elements or components may generally be referred to herein with a single element number. For example a plurality of reference elements 106-1, 106-2, . . . , 106-N may be referred to generally as 106. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments and should not be taken in a limiting sense.

Embodiments of the present disclosure are directed to microservice scheduling, for example, in the context of a software defined data center (e.g., a distributed computing environment) including one or more VCIs and/or containers. As described above, "microservices" refer to containerized instructions that correspond to portions of an application and are structured as a collection of loosely coupled (e.g., containerized) services. Microservices can be created using different coding languages (e.g., as part of a polyglot approach to application deployment). For example, in a microservices architecture, an application can be divided into multiple modular services that can be deployed on containers. The microservices can run fine grained services, and the containers can have short lifespans. As used herein, "fine-grained services" refer to services that make direct use of resources that are granted direct access by one or more application programming interfaces (APIs). In contrast, coarse grained services include services that utilize multiple fine-grained services. Further, as used herein, a "short lifespan" refers to a container that is destroyed after a short period of time (e.g., seconds to minutes), as compared to "long lifespan" containers, which operate for minutes or more before being destroyed. In some embodiments, short lifespan containers are containers that run microservices, which are generally destroyed after a relatively short period of time once the microservice has been executed and consumed by an application.

Due to the short-lived nature of containers on which microservices are deployed, haphazard scheduling of the microservices can incur unwanted latencies in application execution. For example, latencies associated with application execution can exceed desirable thresholds, which can reduce the efficacy of a software defined data center. In addition, network latencies and/or throughput between individual microservices can affect performance of an application that is associated with the microservices.

Embodiments herein may allow for improved scheduling of microservices which can lead to improved performance of a computing system such as a software defined data center, virtual computing cluster, server, or other computing device. For example, by scheduling microservices in accordance with the embodiments described herein, applications can be assembled from microservices more efficiently than in some approaches, which can reduce an amount of computing resources and/or an amount of time required to execute the application. This can lead to reduced downtime, quicker application execution, and/or improved user experience.

FIG. 1 is a diagram of a host 102 for microservice scheduling according to the present disclosure. The system can include a host 102 with processing resource(s) 108 (e.g., one or more processors), memory resource(s) 110 (e.g., one or more main memory devices and/or storage memory devices), and/or a network interface 112. The host 102 can be included in a software defined data center. A software defined data center can extend virtualization concepts such as abstraction, pooling, and automation to data center resources and services to provide information technology as a service (ITaaS). In a software defined data center, infrastructure, such as networking, processing, and security, can be virtualized and delivered as a service. A software defined data center can include software defined networking and/or software defined storage. In some embodiments, components of a software defined data center can be provisioned, operated, and/or managed through an application programming interface (API).

The host 102 can incorporate a hypervisor 104 that can execute a number of VCIs 106-1, 106-2, . . . , 106-N (referred to generally herein as "VCIs 106"). The VCIs can be provisioned with processing resources 108 and/or memory resources 110 and can communicate via the network interface 112. The processing resources 108 and the memory resources 110 provisioned to the VCIs 106 can be local and/or remote to the host 102 (e.g., the VCIs 106 can be ultimately executed by hardware that may not be physically tied to the VCIs 106). For example, in a software defined data center, the VCIs 106 can be provisioned with resources that are generally available to the software defined data center and are not tied to any particular hardware device. By way of example, the memory resources 110 can include volatile and/or non-volatile memory available to the VCIs 106. The VCIs 106 can be moved to different hosts (not specifically illustrated), such that a different hypervisor manages the VCIs 106. In some embodiments, the host 102 can be connected to (e.g., in communication with) a microservice scheduling agent 114, which can be deployed on a VCI 106.

The VCIs 106-1, . . . , 106-N can include one or more containers (e.g., containers 220 illustrated in FIG. 2, herein), which can have a microservice (e.g., microservice 222 illustrated in FIG. 2, herein) running thereon. The microservices can correspond to one or more applications or portions of applications executed by the VCIs 106 and/or the host 102. The application may be configured to perform certain tasks and/or functions for the VCIs 106 and/or the host 102. By executing the application using multiple microservices, scalability and/or portability of applications may be improved in comparison to approaches in which applications are monolithic.

The microservice scheduling agent 114 can be configured to cause container and/or microservice deployment across the VCIs 106, as described in more detail, herein. In some embodiments, the microservice scheduling agent 114 can be deployed on (e.g., may be running on) the host 102, and/or one or more of the VCIs 106.

In some embodiments, the microservice scheduling agent 114 can include a combination of software and hardware, or the microservice scheduling agent 114 can include software and can be provisioned by processing resource 108. An example of the microservice scheduling agent 114 is illustrated and described in more detail with respect to FIGS. 2 and 3, herein. Non-limiting examples of microservice scheduling agents 114 can include container schedulers such as KUBERNETES®, DOCKER SWARM®, MESOS®, etc.

Figure 2:
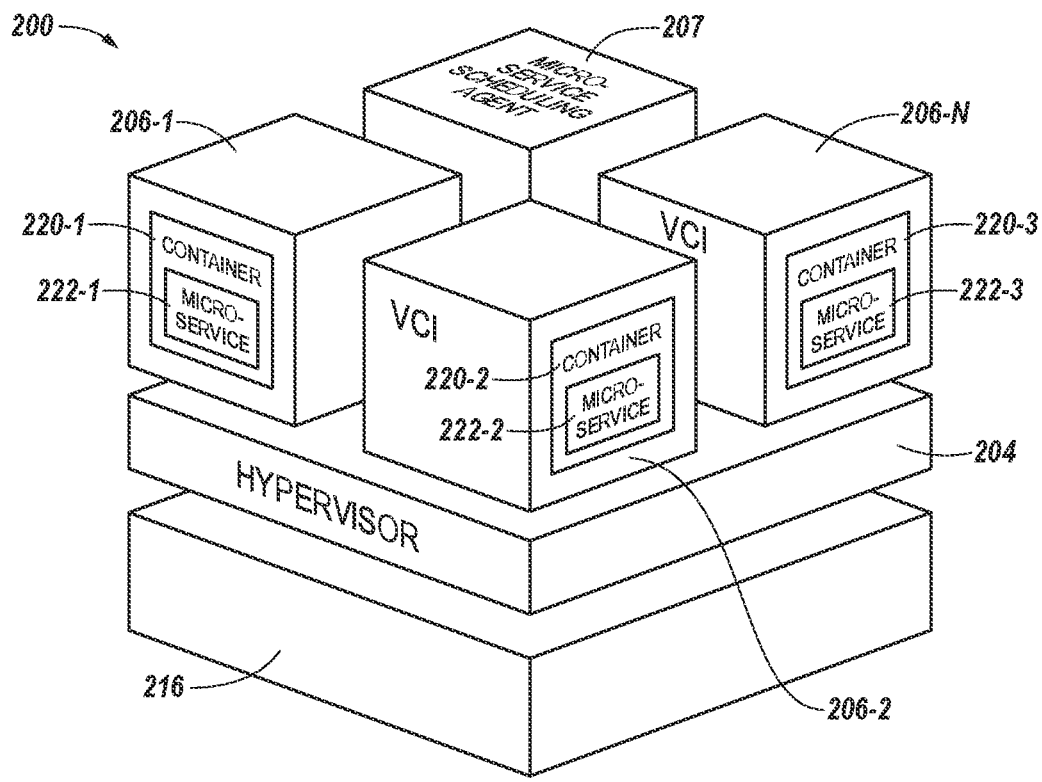
FIG. 2 is a diagram of a simplified system for microservice scheduling according to the present disclosure.

FIG. 2 is a diagram of a simplified system for microservice scheduling according to a number of embodiments of the present disclosure. The system 200 can include a pool of computing resources 216, a plurality of VCIs 206-1, 206-2, . . . , 206-N, a microservice scheduling agent 207, and/or a hypervisor 204. As used herein, an "agent" is a computing component configured to run at least one piece of software that is configured to perform actions without additional outside instruction. For example, an agent can be configured to execute instructions using computing resources, such as hardware, that can be available to the agent in the pool of computing resources.

The system 200 can include additional or fewer components than illustrated to perform the various functions described herein. In some embodiments, the VCIs 206-1, 206-2, . . . , 206-N, and/or the microservice scheduling agent 207 can be deployed on the hypervisor 204 and can be provisioned with the pool of computing resources 216; however, embodiments are not so limited and, in some embodiments, the microservice scheduling agent 207 can be deployed on a VCI (e.g., a master VCI or master node) that controls operation of the VCIs 206. This latter embodiment is described in more detail in connection with FIGS. 3A and 3B, herein.

The pool of computing resources 216 can include physical computing resources used in a software defined data center, for example, compute, storage, and network physical resources such as processors, memory, and network appliances. The VCIs 206-1, 206-2, . . . , 206-N, can be provisioned with computing resources to enable functionality of the VCIs 206-1, 206-2, . . . , 206-N. In some embodiments, the system 200 can include a combination of hardware and program instructions that are configured to provision the VCIs 206-1, 206-2, . . . , 206-N using a pool of computing resources in a software defined data center.

In some embodiments, the microservice scheduling agent 207 can assign VCIs 206 to host the containers 220. For example, when a new container 220 is generated to, for example, run a microservice 222, the microservice scheduling agent 207 can select a VCI (e.g., VCI 206-1) on which to deploy the container (e.g., the container 220-1). As part of selecting the VCI 206 on which to deploy the container 222, the microservice scheduling agent 207 can receive information from respective scheduling sub-agents (e.g., the scheduling sub-agents 326-1, . . . , 326-N illustrated in FIGS. 3A and 3B, herein) corresponding to available resources of the VCIs 206. For example, the microservice scheduling agent 207 can receive information corresponding to an amount of processing resources and/or memory resources allocated to the respective VCIs 206, an amount of processing resources and/or memory resources available to the respective VCIs 206, and/or network state information related to the availability of the VCI 206 to run a container 220.

Figure 3A:
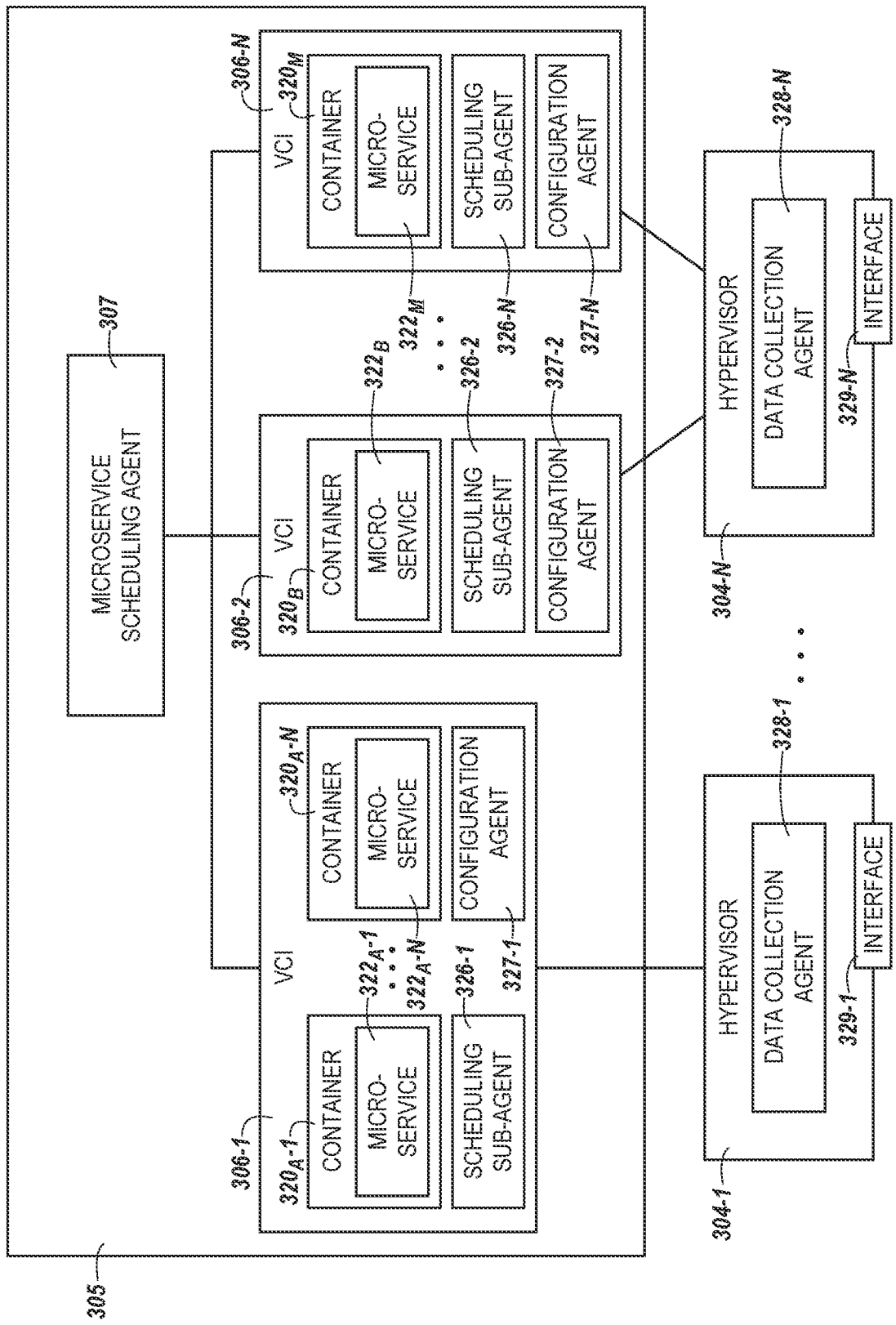
FIG. 3A is a diagram of a system including a scheduling agent, virtual computing instances, and hypervisors for microservice scheduling according to the present disclosure.

FIG. 3A is a diagram of a system including a scheduling agent 307, virtual computing instances 306, and hypervisors 304 for microservice scheduling according to the present disclosure. As shown in FIG. 3A, the system includes a microservice scheduling agent 307, a plurality of VCIs 306-1, . . . , 306-N, and a plurality of hypervisors 304-1, . . . , 304-N. The plurality of VCIs 306 can include respective containers 320, which can run respective microservices 322 (e.g., microservices $322_A$-1, . . . , $322_A$-N, $322_B$, $322_M$, etc.). In addition, the respective VCIs 306 can include respective scheduling sub-agents 326-1, . . . , 326-N. Non-limiting examples of scheduling sub-agents 326 can include KUBELETS®, among other scheduling sub-agents, that may be deployed on the VCIs 306 to communicate resource information and/or network state information corresponding to the VCIs 306 and/or hypervisors 304 on which they are deployed to the microservice scheduling agent 307. The VCIs 306 and hypervisors 304 illustrated in FIGS. 3A and 3B can, in some embodiments, be part of a cluster 305 (e.g., a virtual computing cluster (VCC)).

Although the VCI 306-1 is shown as having a plurality of containers deployed thereon (e.g., the containers $320_A$-1, . . . , $320_A$-N) and the other VCIs 306-2 and 306-N are illustrated as having a single container deployed thereon (e.g., the containers $320_B$ and $320_M$), embodiments are not so limited and the VCIs 306 can include a greater or lesser number of containers based on the resources available to the respective VCIs 306.

The VCIs can include configuration agents 327-1, . . . , 327-N, such as a network virtualization platform node agent that can be configured to retrieve configuration (e.g., interne protocol, media access control, virtual local area network, etc.) information for the VCIs 306. As described in more detail below, in some embodiments, the configuration agents 327-1, . . . , 327-N can receive network state information from the data collection agents 328-1, . . . , 328-N deployed on the hypervisors 304-1, . . . , 304-N. Although shown in FIG. 3A as running on the hypervisors 304, it will be appreciated that the data collection agents 328 may run a bare metal server instead of on a hypervisor 304.

The containers 320 can be configured to run microservices 322 as part of providing an application to be executed by the microservice scheduling agent 307 and/or the VCIs 306. As described above, microservices can include instructions corresponding to modularized, containerized portions of an application. Containers 320 that are running microservices 322 can be "short lived" due to the nature of the microservices. For example, the containers 320 that are running microservices 322 may only be in existence for a short period (e.g., seconds to minutes) of time, and may be destroyed after the microservice 322 running thereon is no longer useful or needed. In some embodiments, the containers 320 that are running microservices 322 may be destroyed after the microservice 322 running thereon has been executed and/or the application that was using the microservice 322 has been executed.

As a result, the microservices 322 can, in some embodiments, affect overall system latency if execution of the microservices 322 is not scheduled effectively. In some approaches, microservices 322 may be scheduled (e.g., by the microservice scheduling agent 307) based solely on resource consumption associated with the VCIs 306 on which the containers 320 to run the microservices 322 are deployed, however, by only taking the resource consumption of the VCIs 306 into account when scheduling execution of the microservices 322, other network parameters that can affect the latency of the microservices 322 (or the application that depends on the microservices) may not be taken into account when scheduling execution of the microservices, which can result in degraded system and/or application performance.

In addition, system latency may be affected by processor (e.g., central processing unit (CPU)) utilization of the hypervisors 304. For example, hypervisor 304 threads can perform additional network processing on behalf of the VCIs 306, however, in some approaches these additional CPU cycles may not be retrievable from CPU statistics collected solely from VCIs 306. As an example, if a VIC (e.g., the VCI 306-1) is operating with one virtual central processing unit (VCPU) and the CPU utilization collected from the VCI 306-1 is 60%, it is still possible that the network processing being performed by the hypervisor (e.g., the hypervisor 304-1) on behalf of the VCI 306-1 is greater than the 60% collected from the VCI 306-1. For example, even if the CPU utilization collected from the VCI 306-1 is 60%, it is possible that the network processing being performed by the hypervisor 304-1 on behalf of the VCI 306-1 is nearly 100%. This can cause workloads running on the VCI 306-1 to experience poor network performance since the hypervisor 304-1 threads may not have enough CPU to perform additional network processing for the VCI 306-1. However, in some embodiments, the data collection agents 328 may have access to statistics regarding the hypervisor 304-1 network processing loads, which can be utilized for microservice scheduling as described herein.

The hypervisors 304-1, . . . , 304-N can include data collection agents 328-1, . . . , 328-N and interfaces 329-1, . . . , 329-N. The data collection agents 328 can periodically or continually collect information such as statistics corresponding to various network states of the cluster 305. For example, the data collection agents 328 can collect statistics on the interfaces 329, which may be physical network interface controllers (pnics), overlay network information (e.g., tunnel states), and/or network flows for the VCIs 306 that host containers 320.

Overlay network information can include information corresponding to network traffic paths between the VCIs 306, hypervisors 304, the microservice scheduling agent 307, and/or other components of the cluster 305. As the use of overlay networks can involve complicated traffic routing, performance of the software defined data center and applications running thereon may be affected by the routing of traffic through the overlay network. To permit routing of traffic through the overlay network, tunnels (e.g., secure shell tunnels) may be used to route traffic between the hypervisors 304 and the VCIs 306 (e.g., to a port of the VCIs 306). By controlling the microservice scheduling agent 307 to analyze and determine traffic routes through the cluster 305 (e.g., by analyzing tunnel state information), the microservice scheduling agent 307 can provide improved microservice scheduling in comparison to approaches in which network states are not considered during microservice scheduling.

In some embodiments, the microservice scheduling agent 307 can collect and analyze statistics corresponding to the interfaces 329 as part of an operation to schedule microservices (e.g., as part of an operation to schedule deployment of containers 320 on which microservices 322 are run). For example, the microservice scheduling agent 307 can determine whether flows in the cluster 305 are short lived (e.g., correspond to microservices and running on containers that exist for second to minutes) or are "long lived," (e.g., high volume flows running on containers that exist for minutes or longer). The determination can be based on a byte count and/or a time threshold associated with execution of a microservice 322 or application. For example, flows that exceed a certain quantity of bytes can be classified as long lived, while flows that do not exceed the certain quantity of bytes can be classified as short lived. In the alternative or in addition, containers 322 that are in existence for seconds to minutes can be classified as short lived, while containers that are in existence for minutes or longer can be classified as long lived.

In addition to, or in the alternative, the data collection agents 328 can collect statistics corresponding to interference from non-container VCIs co-located on hypervisors 304 where VCIs 306 are running a container 320. For example, in public cloud deployments, the data collection agent(s) 328 can detect interference from non-containerized resources that may be consuming VCI 306 resources that the microservice scheduling agent 307 may not be able to detect. In some embodiments, non-container VCIs are VCIs that do not have any containers deployed thereon and are instead running traditional workloads. By using this information, microservice scheduling may be improved in comparison to approaches in which a microservice scheduling agent 307 is unable to detect interference from non-containerized resources running on the VCIs 306. Non-containerized workloads can include traditional workloads such as public cloud, hypervisor deployed workloads and/or VCIs deployed on shared hypervisors.

The microservice scheduling agent 307 can use the determined information (e.g., the byte counts, time thresholds, or other network states described above) to generate scores for the VCIs 306. In some embodiments, the scores can fall within a range of 0-10 (with 10 being the best score and zero being the worst score), however, embodiments are not limited to this particular example and the scores can be based on any scoring system.

In a non-limiting example in which the microservice scheduling agent 307 is preparing to facilitate the scheduling of a new container 320 to run a microservice 322, the microservice scheduling agent 307 can assign a score of 0 (zero) to a VCI (e.g., VCI 306-1) if the microservice scheduling agent 307 determines that a tunnel state corresponding to the VCI 306-1 is in a degraded state. In this example, the microservice scheduling agent 307 can assign the score of zero to the VCI 306-1 because it may not yet be known if a container 320 to be deployed on one of the VCIs 306 will require the use of overlay networking. If the hypervisors 304 are utilizing multiple uplinks, VCI capacity can be assumed to reflect a worst-case scenario in order to provide higher quality microservice scheduling. In some embodiments, the score can be based on additional information described above (e.g., flow statistics, pnic statistics, etc.).

In another non-limiting example, if the VCI 306-2 is running ten long lived or heavy volume flows on the container 320B and another VCI (e.g., the VCI 306-N) is running two long lived heavy volume flows on the containers 320M (noting that both the VCI 306-2 and the VCI 306-N are running on the same hypervisor 304-N), the microservice scheduling agent 307 can assign a lower score to the VCI 306-2 than to the VCI 306-N. Once the scores have been assigned, the microservice scheduling agent 307 can cause the score information to be sent to the configuration agents 327-2 and 327-N running on the VCIs 306-2 and 306-N.

The configuration agents 327-1, . . . , 327-N can run on the VCIs 306 and can communicate with the hypervisors 304 to receive configuration information from the data collection agents 328. The information received form the data collection agents 328 can include information relevant to the VCI 306 on which the configuration agent 328 is running (e.g., the configuration agent 327-1 can receive information corresponding to the VCI 306-1, etc.). In some embodiments, the configuration agents 327 can forward this information on to the microservice scheduling agent 307 to facilitate microservice scheduling, as described herein. For example, the configuration agents 327 can forward information corresponding to network states for the VCIs 306 and/or the hypervisors 304 to the microservice scheduling agent 307 to be used in the process of scheduling container deployment on the VCIS 306 and microservice deployment on the containers 320.

A further non-limiting example of microservice scheduling in accordance with the disclosure follows: When a cluster 305 is generated, the data collection agents 328-1, . . . , 328-N on the hypervisors 304-1, . . . , 304-N can periodically (or continually) collect statistics on the network states, as described above. While the data collection agents 328 are collecting statistics on the network states, the data collection agents 328 can generate scores for the VCIs 306 based on the network states as described above.

The data collection agents 328 can forward the information and/or the scores to the configuration agents 327-1, . . . , 327-N on the VCIs 306. In some embodiments, the data collection agents 328 can periodically forward the information and/or scores at set or configurable time intervals. In one non-limiting example, the data collection agents 328 can forward the information and/or scores to the configuration agents 328 every few or tens of milliseconds (e.g., every 30 milliseconds, etc.). Embodiments are not so limited, however, and in some embodiments, the data collection agents 328 can forward the information and/or scores to the configuration agents 327 in response to a detection that a threshold change has occurred in the information and/or scores since the last information and/or scores were sent to the configuration agents 327.

The configuration agents 327 can advertise or forward the information and/or scores received from the data collection agents 328 to the microservice scheduling agent 307. In some embodiments, the configuration agents 327 can advertise the information and/or scores to the microservice scheduling agent 307 via an application programming interface (API) call, or the configuration agents 327 can forward the information and/or scores to the microservice scheduling agent 307 periodically or in response to receipt of the information and/or scores from the data collection agents 328.

If, in the example shown in FIG. 3A, the cluster 305 includes two hypervisors 304-1 and 304-N and there are more long lived heavy flows running inside the container(s) $320_A$-1, . . . , $320_A$-N on the VCI 306-1 than there are running on the container(s) $320_B$ on the VCI 306-2, the score for the VCI 306-1 will be lower than the score for the VCI 306-2. In some embodiments, a weighting of other network states, such as pnic statistics or tunnel states associated with the hypervisors 304-1, . . . , 304-N may also be factored into the score.

If a new container is to be created, the microservice scheduling agent 307 can determine on which VCI 306 to schedule the container deployment based on resources available to the VCIs 306 in addition to the network state scores. By including the determined network state information in the calculus performed by the microservice scheduling agent 307 in addition to the resources available to the VCIs 306 when scheduling deployment of new containers 320, performance of microservices and the applications that depend on the microservices 322 can be improved in comparison to approaches in which only the resources available to the VCIs 306 are taken into account. In addition, because the network state information and/or scores can be asynchronously sent by the data collection agents 328, delays in network traffic may be further mitigated in comparison to some approaches.

As shown in FIG. 3A, the cluster 305 (e.g., the VCC) can include a plurality of virtual computing instances (VCIs) 306 provisioned with a pool of computing resources (e.g., processing resources 108 and/or memory resources 110 illustrated in FIG. 1, herein) and ultimately executed by hardware. In some embodiments, at least a first VCI (e.g., the VCI 306-1) is deployed on a first hypervisor (e.g., the hypervisor 304-1) of the VCC 305 and at least a second VCI (e.g., the VCI 306-2) is deployed on a second hypervisor (e.g., the hypervisor 304-N) of the VCC 305. The VCIs 306 can include containers 320.

In some embodiments, the VCC 305 can include a scheduling agent (e.g., the microservice scheduling agent 307) that can be configured to receive, from a first configuration agent 327-1 deployed on the first VCI 306-1, a score corresponding to a network state of the first hypervisor

304-1 and receive, from a second configuration agent 327-2 deployed on the second VCI 306-2, a score corresponding to a network state of the second hypervisor 304-N. The scheduling agent 307 can further be configured to cause a container 320 to be deployed on at least one of the first VCI 306-1 and the second VCI 306-2 based, at least in part, on the score corresponding to a network state of the first hypervisor 304-1 and the score corresponding to a network state of the second hypervisor 304-N.

The scheduling agent 307 can be further configured to cause the container to be deployed based, at least in part, on a determination that at least one network state for the first VCI 306-1 or the second VCI 306-2 meets a network state criterion. As described above, the network state criteria can include pnic statistics, tunnel state statistics, network flow statistics, scores, etc. In some embodiments, the scheduling agent 307 is further configured to cause the container 320 to be deployed on the first VCI 306-1 or the second VCI 306-2 based, at least in part, on a determination that a latency associated with execution of a microservice 322 running on the first VCI 306-1 or the second VCI 306-2 has exceeded a threshold latency value. The latency value can be determined by the scheduling agent 307, the scheduling sub-agents 326, the configuration agents 327, and/or the data collection agent 328. The latency value may correspond to an amount of time a microservice 322 takes to execute or may be based on an amount of time an application using the microservices 322 takes to execute.

In some embodiments, a first data collection agent 328-1 may be deployed on the first hypervisor 304-1. The first data collection agent 328-1 may be configured to generate the first score based, at least in part, on collected network state data and send the first score the to the first configuration agent 237-1. A second data collection agent 328-N can be deployed on the second hypervisor 304-N. The second data collection agent 328-N can be configured to generate the second score based, at least in part, on collected network state data and send the second score the to the first configuration agent.

The scheduling agent 307 can be configured to receive the first score based, at least in part, on a determination by the first configuration agent that the first score has changed greater than a threshold amount within a predetermined time period and/or receive the second score based, at least in part, on a determination by the second configuration agent that the second score has changed greater than a threshold amount within the predetermined time period. For example, if the first score or the second score do not change during a predetermined threshold period of time, the scheduling agent 307 may not receive updated score information corresponding to the first score and/or the second score. However, if the first score and/or the second score change more than a threshold amount during the predetermined period of time, the scheduling agent 307 may receive updated score information corresponding to the first score and/or the second score. This may reduce additional traffic when the network states aren't changing much while still allowing for updated network state information (e.g., scores) to be updated by the scheduling agent 307 when the state of the network changes. In some embodiments, the scheduling agent 307 can be further configured to schedule a microservice 322 on the container 320 based, at least in part, on the score corresponding to the network state of the first hypervisor 304-1 and the score corresponding to the network state of the second hypervisor 304-N.

Figure 3B:
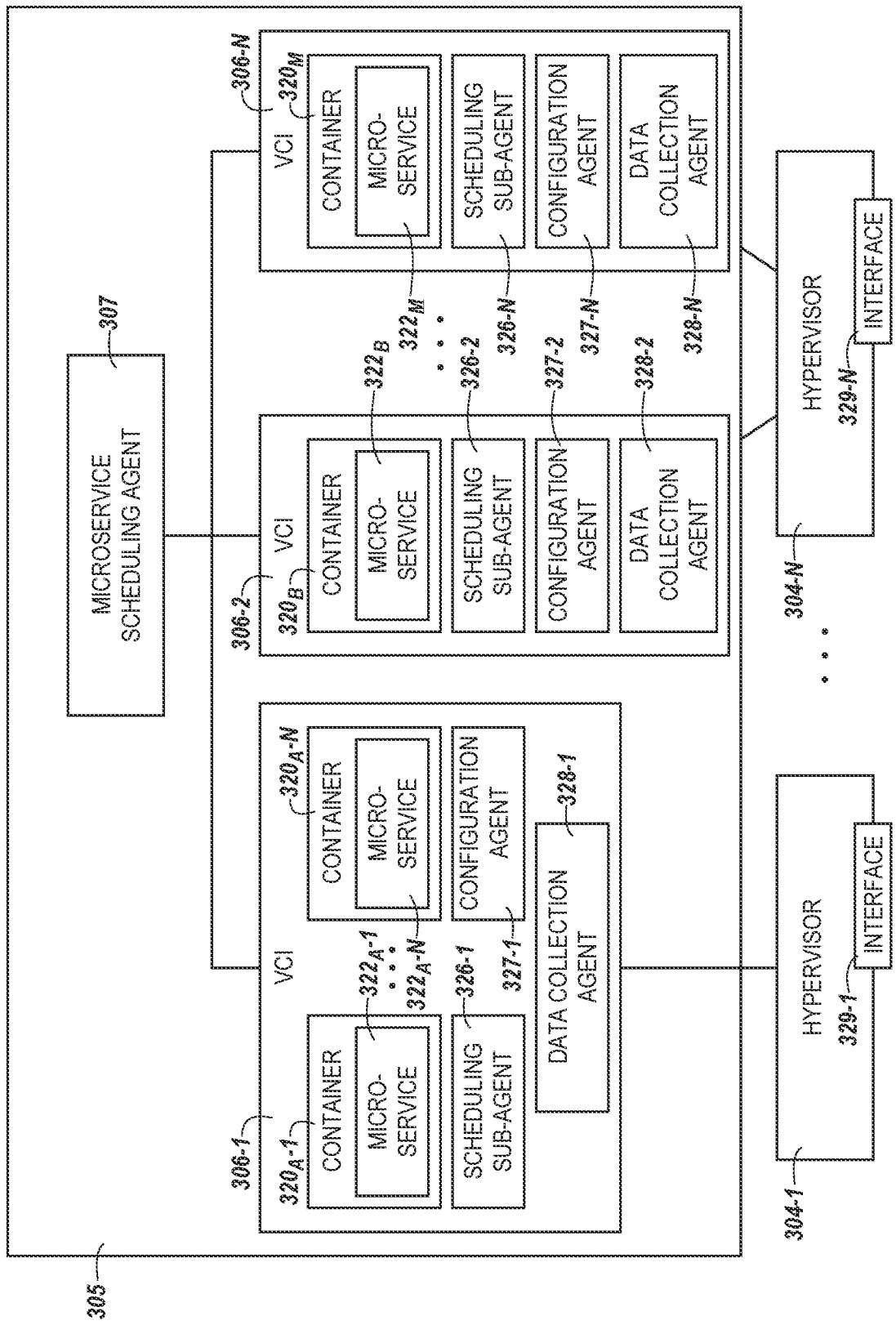
FIG. 3B is another diagram of a system including a scheduling agent, virtual computing instances, and hypervisors for microservice scheduling according to the present disclosure.

FIG. 3B is another diagram of a system including a scheduling agent 307, virtual computing instances 306, and hypervisors 304 for microservice scheduling according to the present disclosure. As shown in FIG. 3B, the system, which can be a virtual computing cluster (VCC) 305, includes a microservice scheduling agent 307, a plurality of VCIs 306-1, . . . , 306-N, and a plurality of hypervisors 304-1, . . . , 304-N. The plurality of VCIs 306 can include respective containers 320, which can run respective microservices 322 (e.g., microservices 322A-1, . . . , $322_A$-N, $322_B$, $322_M$, etc.). In addition, the respective VCIs 306 can include respective scheduling sub-agents 326-1, . . . , 326-N and data collection agents 328-1, . . . , 328-N.

In some embodiments, the VCC 305 can include a scheduling agent 307 that can be configured to receive, from a first data collection agent 328-1 deployed on the first VCI 306-1, network state information corresponding to the first VCI 306-1. The scheduling agent 307 can also receive, from a second data collection agent 328-2 deployed on the second VCI 306-1, network state information corresponding to the second VCI 306-1. The scheduling agent 307 can be further configured to cause a container 320 to be deployed on at least one of the first VCI 306-1and the second VCI 306-2 based, at least in part, on the network state information corresponding to the first VCI 306-1 and the network state information corresponding to the second VCI 306-2.

As described above, the network state information can include statistics such as pnic statistics, latency statistics, etc. In some embodiments, the network state information can include information corresponding to data traffic in the VCC 305. The data traffic can be classified based on the size of flows corresponding to the data traffic. For example, data traffic corresponding to small flows, which may be referred to as "mice flows" can include flows that are approximately 10 kilobytes in size or less, while data traffic corresponding to large flows, which may be referred to as "elephant flows" can include flows that are approximately 10 kilobytes in size or greater. In some embodiments, the data collection agents 328 can analyze data traffic to determine a quantity (e.g., a number) of mice flows and a quantity of elephant flows associated with the VCIs 306. This information can then be used by the scheduling agent 307 to determine which VCIs to deploy containers 320 to run microservices 322 on.

Further, as described above in connection with FIG. 3A, the data collection agents 328 can generate respective scores for the VCIs 306 based on the network state information collected by the data collection agents 328. These scores may be sent to the scheduling agent 307 and/or the scheduling sub-agents 326 as part of microservice scheduling according to the disclosure. For example, the scheduling agent 307 can schedule microservice 322 deployment on containers 320 running on the VCIs 306 based on the respective generated scores for the network state information.

Figure 4A:
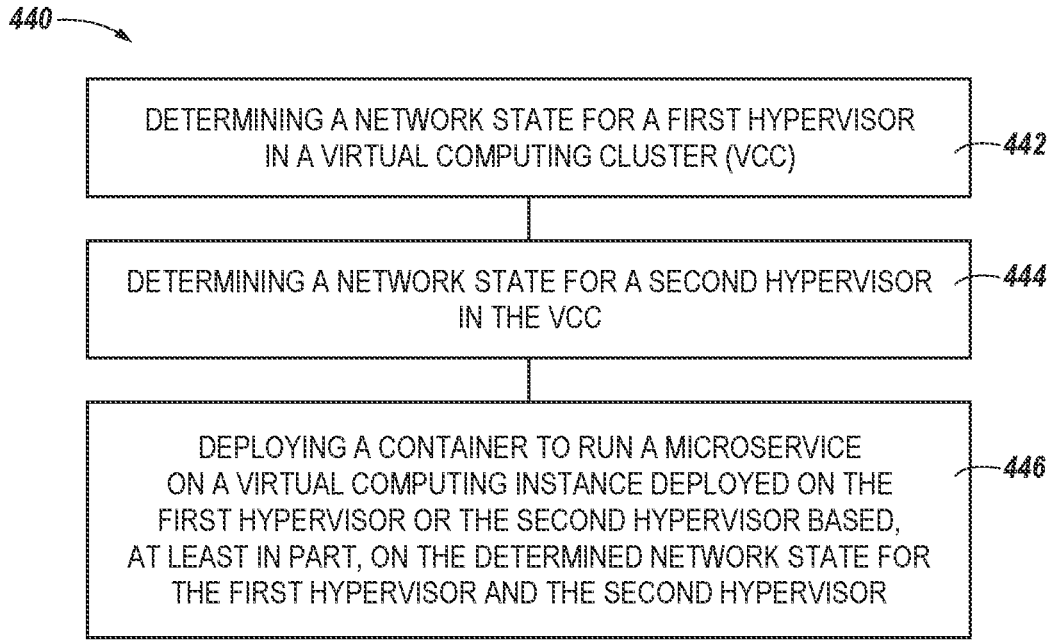
FIG. 4A is a flow diagram representing a method for microservice scheduling according to the present disclosure.

FIG. 4A is a flow diagram representing a method 440 for microservice scheduling according to the present disclosure. At block 442, the method 440 can include determining a network state for a first hypervisor in a virtual computing cluster (VCC). The VCC can be analogous to the cluster 305 illustrated in FIGS. 3A and 3B, herein. In some embodiments, determining the network state for the first hypervisor and the second hypervisor can include determining a tunnel state corresponding to at least one of the first hypervisor and the second hypervisor. Embodiments are not so limited, however, and determining the network state for the first hypervisor and/or the second hypervisor can include determining various network state criteria described above in connection with FIGS. 3A and 3B. In some embodiments, the container to run the microservice can be deployed on the VCI based on the determined tunnel state for the first hypervisor and/or the second hypervisor.

At block 444, the method 440 can include determining a network state for a second hypervisor in the VCC. In some embodiments, determining the network state for the second hypervisor can include determining a tunnel state corresponding to the second hypervisor. Embodiments are not so limited, however, and determining the network state for the second hypervisor can include determining various network state criteria described above in connection with FIGS. 3A and 3B. In some embodiments, the container to run the microservice can be deployed on the VCI based on the determined tunnel state for the first hypervisor and/or the second hypervisor.

At block 446, the method 440 can include deploying a container to run a microservice on a virtual computing instance (VCI) deployed on the first hypervisor or the second hypervisor based, at least in part, on the determined network state for the first hypervisor and the second hypervisor. The network state can be determined as described above in connection with FIGS. 3A and 3B. For example, the container can be deployed on the VCI based on a determination that at least one of the network states for the first hypervisor or the second hypervisor meets a network state criterion. In some embodiments, deploying the container on the VCI can be based, at least in part, on the determined tunnel state for the first hypervisor or the second hypervisor. In other embodiments, the container can be deployed on the VCI based, at least in part, on a determination that a microservice ranking score generated by a data collection agent running on the first hypervisor or the second hypervisor is lower for the hypervisor on which the VCI is deployed.

Embodiments are not so limited, however, and the container can be deployed on the VCI based, at least in part, on a determination that the container is to be operational for less than a threshold period of time. For example, the container can be deployed on the VCI based on a determination that the container is short lived (e.g., has a microservice running thereon). In other embodiments, the container can be deployed on the VCI based on a determination that a ratio of elephant flows to mice flows executed in the VCC falls within a predetermined range. For example, if a threshold amount of traffic on one of the hypervisors corresponds to elephant flows and the other hypervisor has a lower amount of traffic corresponding to elephant flows associated therewith, the container can be deployed on a VCI that is deployed on the hypervisor having the smaller percentage of elephant flows associated therewith.

In some embodiments, a latency associated with execution of an application corresponding to the microservice can be determined, and the container can be deployed on the VCI based, at least in part, on a determination that the latency associated with execution of the application has exceeded a threshold application latency value. The latency can refer to an amount of additional time it takes to run an application due to the network states and/or memory usage of the VCIs and/or hypervisors on which the VCIs are deployed. Latencies for each microservice can, in some examples, be summed to yield an overall latency associated with execution of the application.

Determining the network state can also include determining average network utilization associated with uplinks corresponding to the first hypervisor and/or the second hypervisor, as described above. In some embodiments, the container can be deployed on the VCI based on the average network utilization associated with uplinks corresponding to the hypervisor on which the VCI is deployed.

In some embodiments, the method 440 can comprise generating a virtual computing cluster (VCC), such as the cluster 305 illustrated in FIGS. 3A and 3B, herein. Once the VCC is generated, a data collection agent (e.g., the data collection agents 328 illustrated in FIGS. 3A and 3B, herein) can collect information corresponding to network states of the VCC. As described in connection with FIGS. 3A and 3B, the data collection agent(s) can generate scores for the network states and forward the network state information and/or the scores to configuration agents (e.g., the configuration agents 327 illustrated in FIGS. 3A and 3B), which can be deployed on VCIs (e.g., the VCIs 306 illustrated in FIGS. 3A and 3B) of the VCC. For example, the network state can be determined using a data collection agent running on the first hypervisor or the second hypervisor. In such examples, deploying the container on the VCI can be further based on a determination that a microservice ranking score generated by a data collection agent running on the first hypervisor or the second hypervisor is lower for the hypervisor on which the VCI is deployed.

The method 440 can further include advertising, by the configuration agents, the network state information and/or scores received from the data collection agents to a microservice scheduling agent (e.g., the microservice scheduling agent 307 illustrated in FIGS. 3A and 3B) of the VCC. The microservice scheduling agent can be configured to schedule deployment of containers (e.g., the containers 320 illustrated in FIGS. 3A and 3B) based on the network state information and/or the scores received from the configuration agents.

Figure 4B:
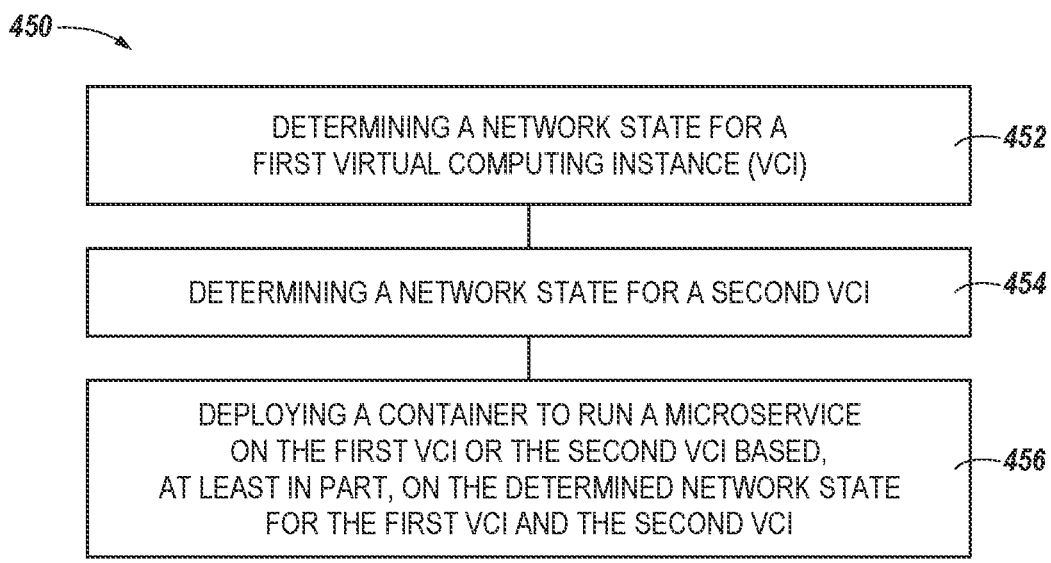
FIG. 4B is another flow diagram representing a method for microservice scheduling according to the present disclosure.

FIG. 4B is another flow diagram representing a method 450 for microservice scheduling according to the present disclosure. At block 452, the method 450 can include determining a network state for a first VCI. In some embodiments, determining the network state for the first VCI can include determining a tunnel state corresponding to the first VCI. Embodiments are not so limited, however, and determining the network state for the first VCI can include determining various network state criteria described above in connection with FIGS. 3A and 3B.

At block 454, the method 450 can include determining a network state for a second VCI. In some embodiments, determining the network state for the second VCI can include determining a tunnel state corresponding to the second VCI. Embodiments are not so limited, however, and determining the network state for the second VCI can include determining various network state criteria described above in connection with FIGS. 3A and 3B.

At block 456, the method 450 can include deploying a container to run a microservice on the first VCI or the second VCI based, at least in part, on the determined network state for the first VCI and the second VCI. The network state can be determined as described above in connection with FIGS. 3A and 3B. For example, the container can be deployed on the first VCI or the second VCI based on a determination that at least one of the network states for the hypervisor meets a network state criterion. In some embodiments, deploying the container on the first VCI or the second VCI can be based, at least in part, on the determined tunnel state for the first VCI or the second VCI. In other embodiments, the container can be deployed on the first VCI or the second VCI based, at least in part, on a determination that a microservice ranking score generated by a data collection agent communicatively coupled to the first VCI and the second VCI is lower for the second VCI than for the first VCI.

Embodiments are not so limited, however, and the container can be deployed on the first VCI or the second VCI based, at least in part, on a determination that the container is to be operational for less than a threshold period of time. For example, the container can be deployed on the first VCI or the second VCI based on a determination that the container is short lived (e.g., has a microservice running thereon). In some embodiments, a latency associated with execution of an application corresponding to the microservice can be determined, and the container can be deployed on the first VCI or the second VCI based, at least in part, on a determination that the latency associated with execution of the application has exceeded a threshold application latency value. The latency can refer to an amount of additional time it takes to run an application due to the network states and/or memory usage of the VCIs and/or hypervisors on which the VCIs are deployed. Latencies for each microservice can, in some examples, be summed to yield an overall latency associated with execution of the application.

Determining the network state can also include determining average network utilization associated with uplinks corresponding to a hypervisor on which the first VCI or the second VCI is deployed, as described above. In some embodiments, the container can be deployed on the first VCI or the second VCI based on the average network utilization associated with uplinks corresponding to the hypervisor on which the first VCI or the second VCI is deployed.

In some embodiments, the method can include determining the network states for the first VCI and the second VCI using a data collection agent such as the data collection agents 328 illustrated and described above in connection with FIGS. 3A and 3B. For example, the information corresponding to the network states for the first VCI and the second VCI can be collected by a data collection agent deployed on a hypervisor, as shown in FIG. 3A, or the information corresponding to the network states for the first VCI and the second VCI can be collected by a data collection agent deployed on the VCIs, as shown in FIG. 3B.

The method can further include determining a network state for a first virtual computing instance (VCI) on which a container executing the microservice is deployed. In some embodiments, determining the network state for the first VCI can include determining a tunnel state corresponding to the first VCI. Embodiments are not so limited, however, and determining the network state for the first VCI can include determining various network state criteria described above in connection with FIGS. 3A and 3B.

The method can include determining a network state for a second VCI. In some embodiments, determining the network state for the second VCI can include determining a tunnel state corresponding to the second VCI. Embodiments are not so limited, however, and determining the network state for the second VCI can include determining various network state criteria described above in connection with FIGS. 3A and 3B.

The method can include re-deploying the container on the second VCI based, at least in part, on the determined network state for the first VCI and the second VCI. The network state can be determined as described above in connection with FIGS. 3A and 3B. For example, the container can be deployed (or re-deployed) on first VCI or the second VCI based on a determination that at least one of the network states for the hypervisor meets a network state criterion. In some embodiments, deploying (or re-deploying) the container on the first VCI or the second VCI can be based, at least in part, on the determined tunnel state for the first VCI or the second VCI. In other embodiments, the container can be deployed (or re-deployed) on the first VCI or the second VCI based, at least in part, on a determination that a microservice ranking score generated by a data collection agent communicatively coupled to the first VCI and the second VCI is lower for the second VCI than for the first VCI.

Embodiments are not so limited, however, and the container can be deployed (or re-deployed) on the first VCI or the second VCI based, at least in part, on a determination that the container is to be operational for less than a threshold period of time. For example, the container can be deployed (or re-deployed) on the first VCI or the second VCI based on a determination that the container is short lived (e.g., has a microservice running thereon). In some embodiments, a latency associated with execution of an application corresponding to the microservice can be determined, and the container can be deployed (or re-deployed) on the first VCI or the second VCI based, at least in part, on a determination that the latency associated with execution of the application has exceeded a threshold application latency value. The latency can refer to an amount of additional time it takes to run an application due to the network states and/or memory usage of the VCIs and/or hypervisors on which the VCIs are deployed. Latencies for each microservice can, in some examples, be summed to yield an overall latency associated with execution of the application.

Determining the network state can also include determining average network utilization associated with uplinks corresponding to a hypervisor on which the first VCI or the second VCI is deployed, as described above. In some embodiments, the container can be deployed on the first VCI or the second VCI based on the average network utilization associated with uplinks corresponding to the hypervisor on which the first VCI or the second VCI is deployed.

In some embodiments, the method can comprise generating a virtual computing cluster (VCC), such as the cluster 305 illustrated in FIGS. 3A and 3B, herein. Once the VCC is generated, a data collection agent (e.g., the data collection agents 328 illustrated in FIGS. 3A and 3B, herein) can collect information corresponding to network states of the VCC. As described in connection with FIGS. 3A and 3B, the data collection agent(s) can generate scores for the network states and forward the network state information and/or the scores to configuration agents (e.g., the configuration agents 327 illustrated in FIGS. 3A and 3B), which can be deployed on VCIs (e.g., the VCIs 306 illustrated in FIGS. 3A and 3B) of the VCC.

The method can further include advertising, by the configuration agents, the network state information and/or scores received from the data collection agents to a microservice scheduling agent (e.g., the microservice scheduling agent 307 illustrated in FIGS. 3A and 3B) of the VCC. The microservice scheduling agent can be configured to schedule deployment of containers (e.g., the containers 320 illustrated in FIGS. 3A and 3B) based on the network state information and/or the scores received from the configuration agents.

Figure 5:
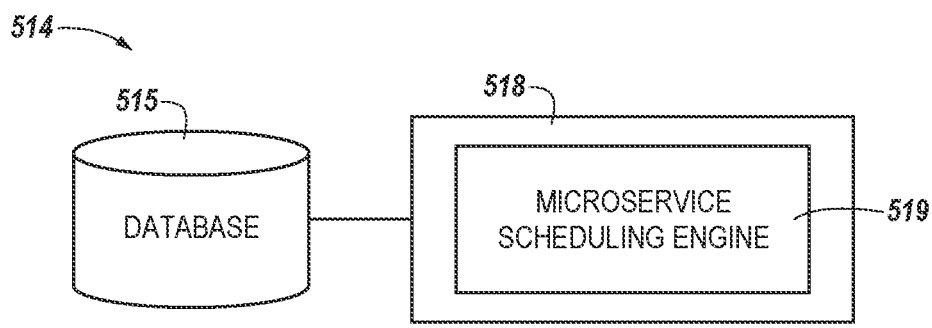
FIG. 5 is a diagram of a system for microservice scheduling according to the present disclosure.

FIG. 5 is a diagram of an apparatus for microservice scheduling according to the present disclosure. The apparatus 514 can include a database 515, a subsystem 518, and/or a number of engines, for example microservice scheduling engine 519, and can be in communication with the database 515 via a communication link. The apparatus 514 can include additional or fewer engines than illustrated to perform the various functions described herein. The apparatus 514 can represent program instructions and/or hardware of a machine (e.g., machine 630 as referenced in FIG. 6, etc.). As used herein, an "engine" can include program instructions and/or hardware, but at least includes hardware. Hardware is a physical component of a machine that enables it to perform a function. Examples of hardware can include a processing resource, a memory resource, a logic gate, etc. In some embodiments, the apparatus 514 can be analogous to the microservice scheduling agent 114 illustrated and described in connection with FIG. 1, herein.

The engines (e.g., 519) can include a combination of hardware and program instructions that are configured to perform a number of functions described herein. The program instructions (e.g., software, firmware, etc.) can be stored in a memory resource (e.g., machine-readable medium) as well as hard-wired program (e.g., logic). Hard-wired program instructions (e.g., logic) can be considered as both program instructions and hardware.

In some embodiments, the microservice scheduling engine 519 can include a combination of hardware and program instructions that can be configured to determine a network state for a first virtual computing instance (VCI) and a second VCI on which a first container and a second container are respectively deployed. The microservice scheduling engine 519 can cause the first container to be deployed (or re-deployed) on the first VCI or the second VCI based, at least in part, on a determination that at least one of the network states for the first or second VCI meets a network state criterion. The network state criterion can include one or more of the network state criteria described above in connection with FIGS. 3A and 3B.

The microservice scheduling engine 519 can further include a combination of hardware and program instructions that can be configured to determine a network state for a hypervisor on which the first VCI or the second VCI is deployed and cause the first container to be deployed on the first VCI or the second VCI based, at least in part, on a determination that at least one of the network states for the hypervisor meets a hypervisor state criterion.

The microservice scheduling engine 519 can further include a combination of hardware and program instructions that can be configured to cause the first container to be deployed on the first VCI or the second VCI based, at least in part, on a determined average network utilization associated with an uplink corresponding to the hypervisor. In some embodiments, the microservice scheduling engine 519 can be configured to re-allocate computing resources to at least one of the first container and the second container based, at least in part, on the determination that the at least one of the network states for the first or second VCI meets the network state criterion, a latency associated with execution of the flow running on the first container has exceeded a threshold, or a combination thereof.

The microservice scheduling engine 519 can further include a combination of hardware and program instructions that can be configured to determine a tunnel state for the first VCI or the second VCI as part of the determination of the network state for the first VCI or the second VCI.

The microservice scheduling engine 519 can further include a combination of hardware and program instructions that can be configured to cause the first container to be deployed on the first VCI or the second VCI based, at least in part, on a determination that the first container is to be operational for less than a threshold period of time.

The microservice scheduling engine 519 can further include a combination of hardware and program instructions that can be configured to cause the first container to be deployed on first VCI or the second VCI based, at least in part, on a determined average network utilization associated with a virtual network interface card corresponding to a hypervisor on which the first VCI and/or the second VCI is deployed.

Figure 6:
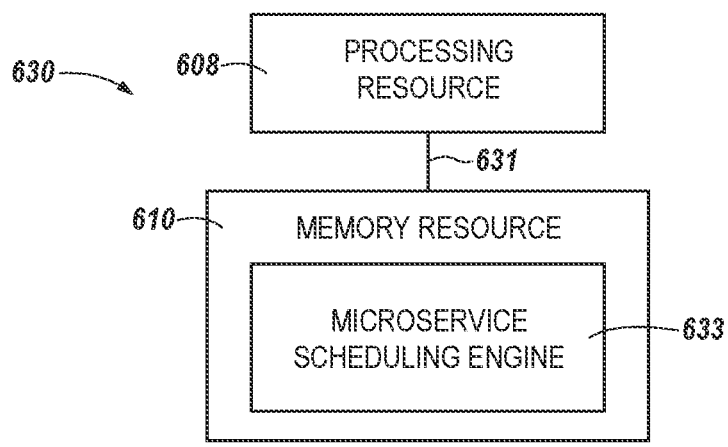
FIG. 6 is a diagram of a machine for microservice scheduling according to the present disclosure.

FIG. 6 is a diagram of a machine for packet generation and injection according to the present disclosure. The machine 630 can utilize software, hardware, firmware, and/or logic to perform a number of functions. The machine 630 can be a combination of hardware and program instructions configured to perform a number of functions (e.g., actions). The hardware, for example, can include a number of processing resources 608 and a number of memory resources 610, such as a machine-readable medium (MRM) or other memory resources 610. The memory resources 610 can be internal and/or external to the machine 630 (e.g., the machine 630 can include internal memory resources and have access to external memory resources). In some embodiments, the machine 630 can be a VCI, for example, the machine 630 can be a server. The program instructions (e.g., machine-readable instructions (MM)) can include instructions stored on the MRM to implement a particular function (e.g., an action such as packet generation and/or injection). The set of MRI can be executable by one or more of the processing resources 608. The memory resources 610 can be coupled to the machine 630 in a wired and/or wireless manner. For example, the memory resources 610 can be an internal memory, a portable memory, a portable disk, and/or a memory associated with another resource, e.g., enabling MM to be transferred and/or executed across a network such as the Internet. As used herein, a "module" can include program instructions and/or hardware, but at least includes program instructions.

Memory resources 610 can be non-transitory and can include volatile and/or non-volatile memory. Volatile memory can include memory that depends upon power to store information, such as various types of dynamic random-access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory, optical memory, and/or a solid-state drive (SSD), etc., as well as other types of machine-readable media.

The processing resources 608 can be coupled to the memory resources 610 via a communication path 631. The communication path 631 can be local or remote to the machine 630. Examples of a local communication path 631 can include an electronic bus internal to a machine, where the memory resources 610 are in communication with the processing resources 608 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof. The communication path 631 can be such that the memory resources 610 are remote from the processing resources 608, such as in a network connection between the memory resources 610 and the processing resources 608. That is, the communication path 631 can be a network connection. Examples of such a network connection can include a local area network (LAN), wide area network (WAN), personal area network (PAN), and the Internet, among others.

As shown in FIG. 6, the MRI stored in the memory resources 610 can be segmented into a number of modules, e.g., 633, that when executed by the processing resource(s)

608, can perform a number of functions. As used herein a module includes a set of instructions included to perform a particular task or action. The module(s) 633 can be sub-modules of other modules. Examples are not limited to the specific module(s) 633 illustrated in FIG. 6.

The module(s) 633 can include program instructions and/or a combination of hardware and program instructions that, when executed by a processing resource 608, can function as a corresponding engine as described with respect to FIG. 5. For example, the microservice scheduling module 633 can include program instructions and/or a combination of hardware and program instructions that, when executed by a processing resource 608, can function as the microservice scheduling engine 519.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method for containerized workload scheduling, comprising:
   determining, at a scheduling agent of a virtual computing cluster (VCC), a network state for:
   a first hypervisor in the VCC; and
   a second hypervisor in the VCC;
   wherein the network state is based at least in part on information derived from network traffic of the VCC;
   determining a latency associated with execution of an application corresponding to the containerized workload; and
   deploying, by the scheduling agent, a container to run a containerized workload on a virtual computing instance (VCI) deployed on the first hypervisor or the second hypervisor based, at least in part, on the determined network state for the first hypervisor and the second hypervisor and on a determination that the latency associated with execution of the application has exceeded a threshold application latency value.

2. The method of claim 1, further comprising determining a network state for the first hypervisor and the second hypervisor using a data collection agent running on the first hypervisor or the second hypervisor.

3. The method of claim 1, wherein determining the network state for the first hypervisor and the second hypervisor further comprises determining a tunnel state corresponding to at least one of the first hypervisor and the second hypervisor, and wherein deploying the container on the VCI is further based, at least in part, on the determined tunnel state for the first hypervisor and the second hypervisor.

4. The method of claim 1, wherein deploying the container on the VCI is further based, at least in part, on a determination that a containerized workload ranking score generated by a data collection agent running on the first hypervisor or the second hypervisor is lower for the hypervisor on which the VCI is deployed.

5. The method of claim 1, wherein deploying the container on the VCI is further based, at least in part, on a determination that a ratio of elephant flows to mice flows executed in the VCC falls within a predetermined range.

6. The method of claim 1, wherein determining the network state for the first hypervisor and the second hypervisor further comprises determining interference information corresponding to non-containerized resources running in the VCC, and wherein deploying the container on the first hypervisor or the second hypervisor is further based, at least in part, on the determined interference information.

7. A method for containerized workload scheduling, comprising:
   determining, at a scheduling agent of a virtual computing cluster (VCC), a network state for:
   a first hypervisor in the VCC; and
   a second hypervisor in the VCC;
   wherein the network state is based at least in part on information derived from network traffic of the VCC, wherein the determining the network state for the first hypervisor and the second hypervisor further comprises:
   determining interference information corresponding to noncontainerized resources running in the VCC; and
   deploying, by the scheduling agent, a container to run a containerized workload on a virtual computing instance (VCI) deployed on the first hypervisor or the second hypervisor based, at least in part, on the determined network state for the first hypervisor and the second hypervisor and on the determined interference information.

8. The method of claim 7, further comprising determining a network state for the first hypervisor and the second hypervisor using a data collection agent running on the first hypervisor or the second hypervisor.

9. The method of claim 7, wherein determining the network state for the first hypervisor and the second hypervisor further comprises determining a tunnel state corresponding to at least one of the first hypervisor and the second hypervisor, and wherein deploying the container on the VCI is further based, at least in part, on the determined tunnel state for the first hypervisor and the second hypervisor.

10. The method of claim 7, wherein deploying the container on the VCI is further based, at least in part, on a determination that a containerized workload ranking score generated by a data collection agent running on the first hypervisor or the second hypervisor is lower for the hypervisor on which the VCI is deployed.

11. The method of claim 7, wherein deploying the container on the VCI is further based, at least in part, on a determination that a ratio of elephant flows to mice flows executed in the VCC falls within a predetermined range.

12. The method of claim 7, further comprising determining a latency associated with execution of an application corresponding to the containerized workload, wherein deploying the container on the VCI is further based, at least in part, on a determination that the latency associated with execution of the application has exceeded a threshold application latency value.

13. A method for containerized workload scheduling, comprising:
   determining, at a scheduling agent of a virtual computing cluster (VCC), a network state for:
      a first hypervisor in the VCC; and
      a second hypervisor in the VCC;
   wherein the network state is based at least in part on information derived from network traffic of the VCC, wherein the determining the network state for the first hypervisor and the second hypervisor further comprises:
      determining a tunnel state corresponding to at least one of the first hypervisor and the second hypervisor; and
   deploying, by the scheduling agent, a container to run a containerized workload on a virtual computing instance (VCI) deployed on the first hypervisor or the second hypervisor based, at least in part, on the determined tunnel state for the first hypervisor and the second hypervisor.

14. The method of claim 13, further comprising determining a network state for the first hypervisor and the second hypervisor using a data collection agent running on the first hypervisor or the second hypervisor.

15. The method of claim 13, wherein deploying the container on the VCI is further based, at least in part, on a determination that a containerized workload ranking score generated by a data collection agent running on the first hypervisor or the second hypervisor is lower for the hypervisor on which the VCI is deployed.

16. The method of claim 13, wherein deploying the container on the VCI is further based, at least in part, on a determination that a ratio of elephant flows to mice flows executed in the VCC falls within a predetermined range.

17. The method of claim 13, further comprising determining a latency associated with execution of an application corresponding to the containerized workload, wherein deploying the container on the VCI is further based, at least in part, on a determination that the latency associated with execution of the application has exceeded a threshold application latency value.

18. The method of claim 13, wherein determining the network state for the first hypervisor and the second hypervisor further comprises determining interference information corresponding to non-containerized resources running in the VCC, and wherein deploying the container on the first hypervisor or the second hypervisor is further based, at least in part, on the determined interference information.

* * * * *